United States Patent
Fischer

[11] 3,777,994
[45] Dec. 11, 1973

[54] RECOVERY OF LEAD FROM ACCUMULATOR SCRAP

[75] Inventor: Rudolf Fischer, Cologne, Germany

[73] Assignee: Klockner-Humboldt-Deutz Aktiengesellschaft, Cologne, Germany

[22] Filed: Jan. 26, 1972

[21] Appl. No.: 221,042

[30] Foreign Application Priority Data
Jan. 29, 1971 Germany.................. P 21 04 130.5

[52] U.S. Cl..................................... 241/24, 241/29
[51] Int. Cl............................................. B02c 21/00
[58] Field of Search .................... 241/20, 24, 25, 29

[56] References Cited
UNITED STATES PATENTS

| | | | |
|---|---|---|---|
| 3,393,876 | 7/1968 | Elmore | 241/20 |
| 2,942,792 | 6/1960 | Anderson et al. | 241/20 X |
| 3,086,718 | 4/1963 | Lukas, Jr. | 241/24 |
| 3,456,886 | 7/1969 | Tremolada | 241/24 X |

Primary Examiner—Granville Y. Custer, Jr.
Attorney—Benjamin H. Sherman et al.

[57] ABSTRACT

Lead accumulators or used storage batteries are coarsely ground into pieces in an impact crusher and the fine material containing metallic lead is separated and ground again and then classified. The remaining part of the coarsely ground material is subjected to a sink-flotation-separation and the fine material recovered as a sludge is introduced into a tubular vibrating mill filled with grinding bodies and ground therein, whereupon the ground material is screened and classified to recover the lead therein.

3 Claims, 1 Drawing Figure

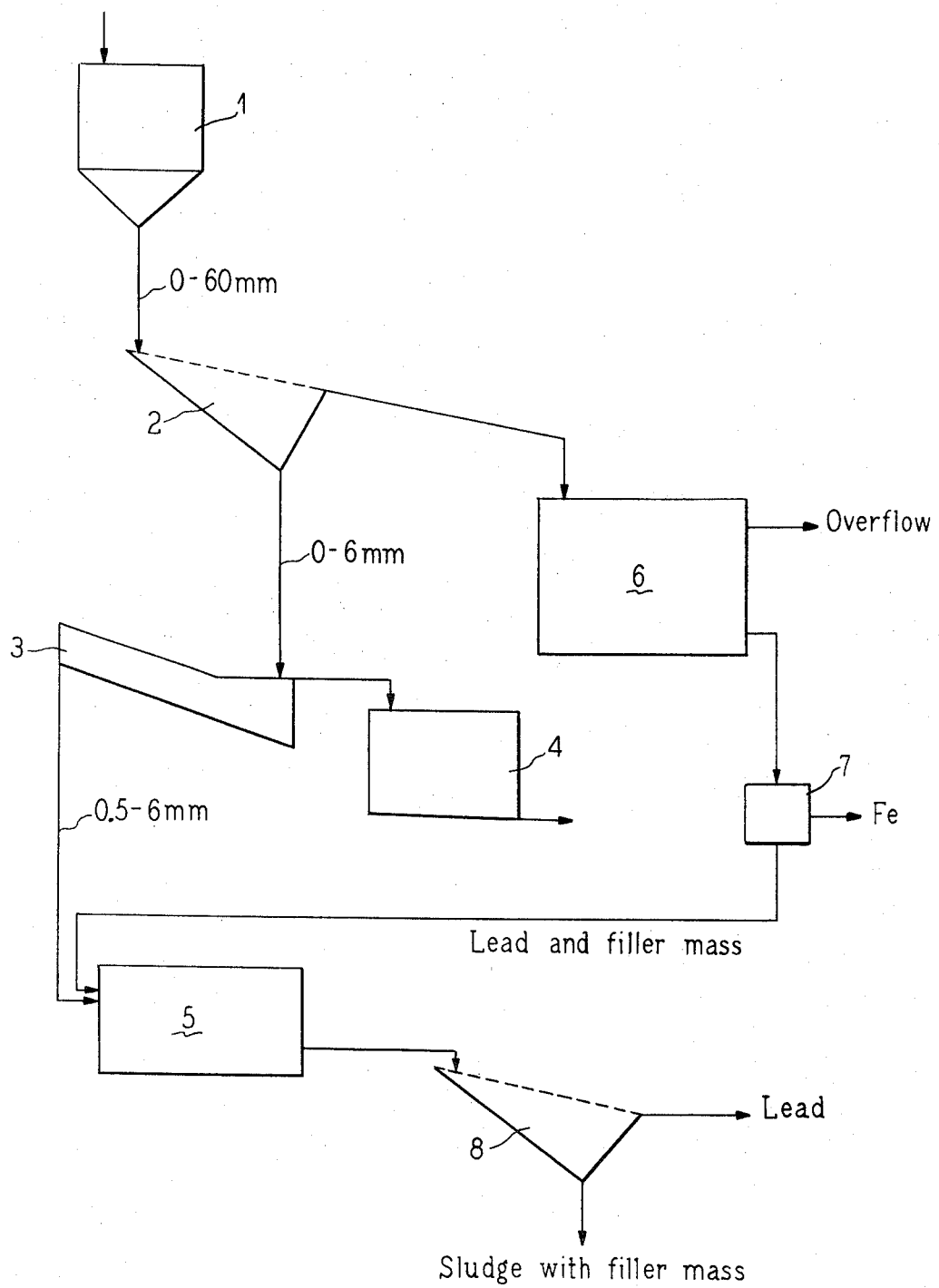

RECOVERY OF LEAD FROM ACCUMULATOR SCRAP

The invention relates to a method for the recovery of the metallic lead component from scrap of accumulators or storage batteries.

In the recovery method known for example from the German laid-out specification No. 1,224,935, the lead accumulators supplied were broken up and coarsely comminuted in suitable devices, for example, in an impact crusher. The material resulting therefrom consists of a mixture of broken casing pieces, grid plates and connecting straps made of lead and the fill mass, each of which is present in amounts depending upon the discharge condition of the accumulators in the form of lead oxide or lead sulphate. The separation of the heavy materials consisting substantially of lead and sometimes iron from the other impurities consisting mainly of broken casing pieces and separators takes place with the aid of a sink-floatation-separation. Since during the grinding up to approximately 40 percent of the comminuted material will be ground to grain-sizes of approximately 0 to about 6 mm., this fine material, before performing the sink-floatation-separation, is separated from the other material in order to attain a reliable performance of the sink-floatation-separation, as a result, a contamination of the sludge through the fine material component is prevented, and through a dosaged addition of the sludge contained in the fine material, the density of the sludge is regulated. During the grinding, however, the fill mass is not completely separated from the grid lead, so that it arrives together with the same in the sink-floatation device. Here the fill mass on account of its high specific weight is deposited together with the lead in the sinks.

On the other hand, it is not avoidable that lead particles during the comminution or crushing together with knocked-off fill mass arrive as screening in the fine material separated prior to the sink-floatation-separation. These lead particles may constitute up to 10 percent of the lead component with reference to the total quantity of material. These lead particles may then be recovered through melting out of the fine material. This, however, has the disadvantage that the exhaust gases produced in such a method contain appreciable quantities of sulphur dioxide, so that a direct melting can be carried out only when the possibility exists of utilizing the exhaust gases, for example during the production of sulphuric acid. In all other cases, particularly for reasons of keeping the air unpolluted, this method is not practicable.

As, however, in the sinks of the sink-floatation-separation consisting principally of metallic lead, still corresponding components of lead-sulphate-containing filler are present, the exhaust gases produced upon melting likewise have corresponding quantities of sulphur dioxide, which may lie above the permissible tolerance limits.

It is the object of the invention to provide a method for the recovery of lead from accumulator scrap, in which a complete separation of the metallic lead component from the fine- and/or coarse material from the other components is accomplished. In accordance with the invention the comminuted and desludged accumulator scrap, after separation of the coarse impurities, is introduced into a further crushing device and subsequently is conveyed to a classifying device. After separation of the coarse impurities which consist principally of broken casing pieces and the comminuted separators made of wood, paper or plastic the comminuted accumulator scrap contains substantially only metallic lead and parts of the filler. The filler portion obviously predominates in the fine material, and may be present in the coarse material above the permissible values. It was found that in a subsequent further comminution, in accordance with the invention, the filler, on account of its brittleness is completely ground, while the metallic lead remains uncomminuted, and upon the subsequent classification may be separated with simple means almost completely from the ground remnants of the filler. According to the type of classifying device used, the further impurities consisting substantially of fine broken casing pieces, which as a rule consist of synthetic materials and thus are not accessible to the comminution, likewise may be separated to a substantial extent from the metallic lead components, for example, by a wind-sifting operation. The lead component recovered in this manner is to a substantial extent free from lead-sulphate-containing impurities, so that the exhaust gases produced in the subsequent melting process contain no appreciable contents of sulphurdioxide.

According to the type of coarse grinding device employed, it is possible to recover a main quantity by the sink-floatation-separation which to a substantial extent is free from a lead-sulphate-containing filler, and therefore may be melted without further ado. In accordance with the invention, it is particularly provided that the desludged fine material produced prior to a sink-floatation-separation is introduced into a grinding device and subsequently is conveyed to a classifying device. In this manner the lead component contained in the fine component of the scrap may be so recovered with advantage that it is introduced into a melting furnace without the sulphur-dioxide content of the furnace exhaust gases increasing to an appreciable extent.

The method according to the invention, provides also for the further comminution of the ground and desludged accumulator scrap. A tube mill filled with grinding bodies, preferably a tubular vibrating mill is employed. The advantage is that in the grinding operation performed by the tube mill or by the tubular vibrating mill, respectively, under the influence of the grinding bodies, the lead components are solely deformed, while the impact and friction stresses completely remove the filler mass still adhering to the lead parts, whereby the pieces of filler mass are completely ground, and thus the separation from the lead parts is appreciably simplified.

A further description of the present invention will be made in conjunction with the following specific example, with reference to the single sheet of drawings which consists of a flow chart illustrating the steps involved in the present invention.

EXAMPLE

For the recovery of the component of metallic lead contained in used lead accumulators, the accumulators are first broken up in an impact crusher 1 and preliminarily ground. The material leaving the impact crusher 1 consists substantially of broken casing pieces, the grid lead with the filler mass still adhering thereto, already ground filler mass, connecting straps consisting of lead, the separators consisting of synthetic material, wood or paper and the like, as well as a certain portion of iron parts, such as handles, fastening elements or the like.

During the coarse grinding operation, a fine material is produced having grain sizes of 0 to 6 mm., which constitutes between 30 and 40 percent of the total charge and still contains 7 to 10 percent metallic lead with reference to the entire charge. In order to obtain a smooth or faultless operation of the sink-floatation device, in which one uses either a separate dense liquid or a heavy medium assisted by the produced sludge, the fine material produced by the impact grinding operation has to be first separated from the other material. Such a separation of the fine material may be performed, for example, by employing a wet sieve 2, whereby the fine material as screenings having a grain size from 0 to 6 mm. is desludged and to a certain degree is dehydrated. This may be accomplished to advantage in a spiral classifier in which grain sizes of 0.5 to 6mm. are withdrawn as solid material, while the finest components are withdrawn together with the liquid and subsequently are thickened to form a sludge in a slurry thickener 4.

The fine material which has been desludged in this manner is now introduced in a tube mill 5 filled with grinding bodies, and is ground. The grinding bodies preferably consist of rods. After passing through such a tube mill, the material preferably is delivered to a wet sieve 8 and classified. The wet sieve 8 depending upon the degree of grinding and the size of the lead particles has a sieve layer with a mesh size up to approximately 1 mm. The sieve residue contains, apart from low quantities of impurities resulting from accumulator or storage battery casings made of synthetic material, — solely the metallic lead component, while the screenings consists of the filler mass which is withdrawn in the form of a sludge. The metallic lead thus recovered may then be melted.

Since during the coarse grinding operation according to the type of machine used, not the entire filler mass is knocked from the grid-lead, a certain amount of the filler mass reaches the sink-floatation device 6 and is here, on account of its high specific weight, withdrawn together with the lead and with any iron components with the heavier phase. In fact it may happen that the portion of lead-sulphate-containing filler mass is so great that in the subsequent melting process, the limits of tolerance permissible for the sulphur dioxide content of the exhaust gases in the subsequent melting process is exceeded. Therefore, after separation of the iron components, for example with the aid of magnets 7, which are arranged over corresponding delivery members, the entire heavier phase is introduced into the tube mill 5, in which due to the action of the grinding bodies, the filler mass still adhering to the lead particles is knocked off and is completely pulverized. In a subsequent classification by means of the sieve 8, the metallic lead is separated from the finely ground filler mass.

The method of the invention is not limited to a classification employing a sieve, but one may also employ to advantage hydrocyclones, spiral classifiers, rapid impact furnaces or similar classifying- or separation-devices. The method is also not limited to a wet classification and wet-grinding operation. The advantages of the method according to the invention are also then fully realized when the comminuted and desludged accumulator scrap after the separation of the coarse impurities is dried and then conveyed in a dry condition to the additional grinding device and subsequently subjected to a dry sifting or air-sifting operation.

What I claim is:

1. A method for the recovery of metallic lead from accumulator scrap comprising:
    1. comminuting the scrap material,
    2. removing coarser materials from the comminuted mass,
    3. subjecting the finer materials to classification to provide a fine grain and a coarse grain fraction,
    4. further comminuting the fine grain fraction from step (3) in a tube mill,
    5. subjecting the lead-containing coarser materials from step (2) to a sink-float separation,
    6. removing iron from the product recovered from step (5),
    7. passing the resulting iron-free product to said tube mill of step (4), and
    8. further classifying the product of step (7).
2. The method of claim 1 in which step (2) is carried out by means of wet sieve filtration.
3. The method of claim 1 in which the separation of iron in step (6) is carried out magnetically.

* * * * *